J. W. ACHARD.
END CELL SWITCH.
APPLICATION FILED DEC. 23, 1911.

1,067,573.

Patented July 15, 1913.

WITNESSES:
J. Lester Woodbridge
Joseph H. Gracy

INVENTOR
John W. Achard
BY
Augustus B. Stoughton,
ATTORNEY.

UNITED STATES PATENT OFFICE.

JOHN W. ACHARD, OF PHILADELPHIA, PENNSYLVANIA.

END-CELL SWITCH.

1,067,573.   Specification of Letters Patent.   Patented July 15, 1913.

Application filed December 23, 1911. Serial No. 667,567.

*To all whom it may concern:*

Be it known that I, JOHN W. ACHARD, a citizen of the United States, and a resident of Philadelphia, in the county of Philadelphia and State of Pennsylvania, have invented certain new and useful Improvements in End-Cell Switches, of which the following is a specification.

My invention relates to end cell switches which are designed for cutting in and out of circuit the end cells or regulating cells of a storage battery.

One of the principal objects of my invention is to provide a compact and economical construction and arrangement of the various parts of such an end cell switch where large current carrying capacity is required.

The general nature of my invention will be more clearly understood by reference to the following description taken in connection with the accompanying drawings, in which—

Figure 1:
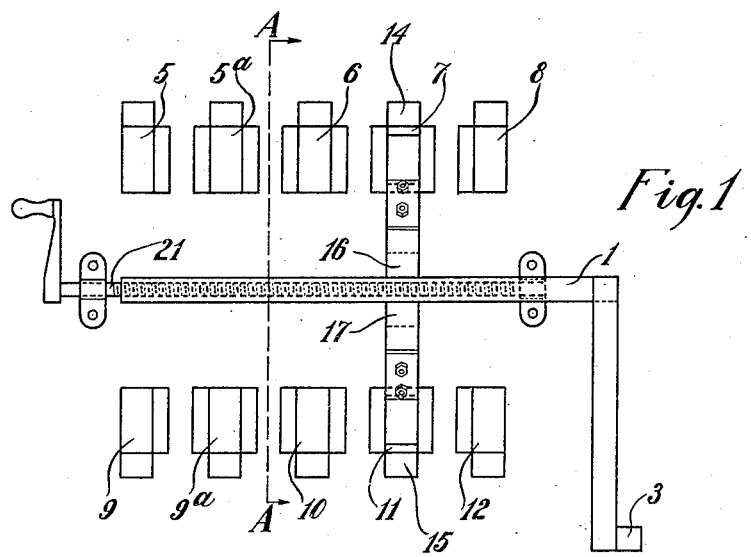
Figure 2:
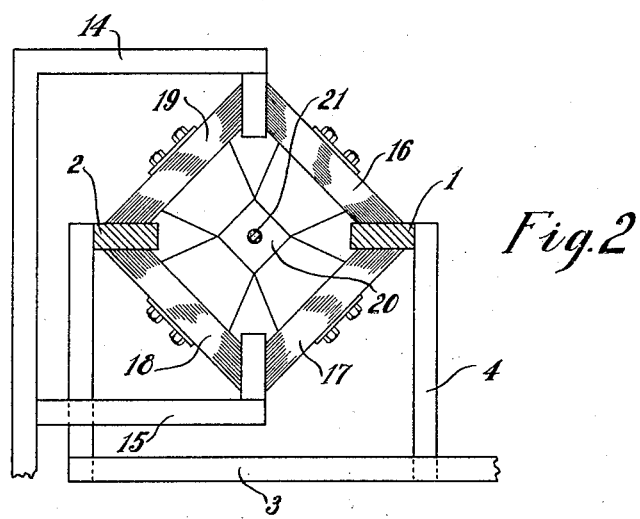

Figure 1 is an elevation of an end cell switch constructed in accordance with my invention, while Fig. 2 is a section taken in the plane A A of Fig. 1.

Referring to these figures, 1 and 2 represent two continuous conducting rails of the end cell switch which are connected together and to any desired circuit by means of the conductors 3 and 4.

5, 5$^a$, 6, 7 and 8 constitute one row and 9, 9$^a$, 10, 11 and 12 another row of terminal contacts which are connected together in pairs by means of conductors such as 14 and 15, from whose junction points connection may be made to various end cells of the battery.

Four brushes, 16, 17, 18 and 19 are shown carried by and suitably insulated from a traveling carriage or nut 20, which may be moved longitudinally by means of the screw 21. It will be seen that the continuous rails 1 and 2 are connected in parallel, so that the current flowing between the battery and the circuit is divided between them, and that each pair of opposite switch points, such as 7 and 11 are also connected in parallel, each carrying half of the total current. Each of the four traveling brushes carries one-quarter of the total current. This arrangement permits a switch of large capacity to be constructed in a comparatively small space. The length of the traveling brushes is reduced to a minimum, and the laminations of which they are composed may be straight. It will also be noted that the contact pressure is balanced on opposite sides of the contact points and of the rails, and also on opposite sides of the traveling carriage 20, so that there is no tendency to distort these parts or throw them out of line. The desired pressure between the brushes and the contact points and rails is produced and may be adjusted by means of the bolts shown in the drawings.

Having described my invention, what I claim and desire to secure by Letters Patent is—

1. In an end cell switch, a plurality of contact rails and an equal number of rows of contact points alternating with the rails, said rails and rows of contact points being spaced around and parallel to a common axis, traveling brushes connecting each rail with the adjacent rows of contact on either side, and means for moving said brushes simultaneously.

2. In an end cell switch, a plurality of interconnected contact rails and an equal number of interconnected rows of contact points alternating with the rails, said rails and rows of contact points being spaced around and parallel to a common axis, traveling brushes connecting each rail with the adjacent rows of contacts on either side, and means for moving said brushes simultaneously.

3. An end cell switch comprising the combination of parallel rows of contacts and contact rails arranged in pairs at the opposite corners of an imaginary parallelogram, brushes for connecting the rows and rails arranged along the sides of the parallelogram and means for moving the brushes longitudinally of the rows and rails.

4. An end cell switch comprising the combination of parallel rows of contacts and contact rails arranged in pairs at the opposite corners of an imaginary parallelogram, a screw at the center of the parallelogram, a nut on the screw and brushes carried by the nut for connecting the rows and rails, said brushes arranged along the sides of the parallelogram.

5. In an end cell switch, the combination of a screw, rows of contacts and contact rails spaced away from and parallel to the screw and disposed in pairs diametrically of the screw, a nut on the screw having radial arms, and brushes coöperating with the rails and rows of contacts, disposed crosswise of the arms.

In witness whereof I have hereunto signed my name.

JOHN W. ACHARD.

Witnesses:
T. S. HAMMERSLEY,
C. V. JORDAN.